United States Patent [19]

Ozawa

[11] Patent Number: 5,713,050
[45] Date of Patent: Jan. 27, 1998

[54] METHOD AND APPARATUS FOR CHECKING BATTERY IN CAMERA

[75] Inventor: Katsuji Ozawa, Omiya, Japan

[73] Assignee: Fuji Photo Optical Co., Ltd., Omiya, Japan

[21] Appl. No.: 640,716

[22] Filed: May 1, 1996

[30] Foreign Application Priority Data

May 1, 1995 [JP] Japan ............... 7-107308

[51] Int. Cl.$^6$ ............... G03B 17/00; G03B 7/26
[52] U.S. Cl. ............... 396/56; 396/301
[58] Field of Search ............... 354/468, 67, 266, 354/131, 484, 267.1; 396/56–59, 301, 302; 340/433; 348/207, 211, 213, 372

[56] References Cited

U.S. PATENT DOCUMENTS

| | | | |
|---|---|---|---|
| 4,816,862 | 3/1989 | Taniguchi et al. | 354/412 |
| 4,912,499 | 3/1990 | Desormeaux | 354/468 |
| 4,982,220 | 1/1991 | Akasaka | 354/468 |
| 5,041,861 | 8/1991 | Taniguchi et al. | 354/468 |
| 5,095,308 | 3/1992 | Hewitt | 340/825.44 |
| 5,446,512 | 8/1995 | Mogamiya | 354/131 |

FOREIGN PATENT DOCUMENTS 1128051  5/1989  Japan.

Primary Examiner—David M. Gray
Assistant Examiner—Eric Nelson
Attorney, Agent, or Firm—Sixbey, Friedman, Leedom & Ferguson; David S. Safran

[57] ABSTRACT

When a remote control shot mode is set, a voltage of an electric battery mounted in a camera is detected. The detected voltage is compared with a predetermined remote control OK voltage. A quantity of electricity consumed within 5 minutes until function of automatic power-off is operated after the remote control shot mode is set, is added to a quantity of electricity consumed from a shutter release by a remote controller to the setting of a next frame shot. The added value is converted into a voltage of the electric battery to be the remote control OK voltage. The remote control shot mode is allowed only if the detected voltage of the electric battery is more than the remote control OK voltage. As a result, when the setting of the remote controller shot mode is allowed, the photographing can be performed without fail.

12 Claims, 4 Drawing Sheets

METHOD AND APPARATUS FOR CHECKING BATTERY IN CAMERA

BACKGROUND OF THE INVENTION

1. Field of the Invention

The present invention relates to a method and an apparatus for checking a battery in a camera and more particularly to a method and an apparatus for checking a battery in a camera which is provided with a function of a remote control shot and a function of automatically turning off the power.

2. Description of the Related Art

There is the conventional camera having a function of checking a residual capacity of a battery. In this camera, the residual capacity of an electric battery is displayed on a liquid crystal display plate, etc. Moreover, when the residual capacity of the electric battery is not enough to continue a photographing, a caution lamp is lighted so as to notice a photographer to replace the electric battery. In this kind of cameras, it is possible for the photographer to see when to replace the electric battery. So, the photographer can avoid a situation in which a shutter chance is lost because of the empty electric battery.

There is the other type of conventional camera having a function of a remote control shot in which a photographing operation such as a shutter release, etc. is carried out by means of a remote controller, and a function of automatically turning off power in which a supply of electric power to each circuit is automatically stopped so as to save the electric power in the electric battery when the operation is not performed within a predetermined time.

When performing the remote control shot (remote control shot mode), the electric power is supplied to an IC for remote control (remote control IC), which provides and receives a signal from the remote controller. Therefore, the camera consumes the electric power several times as much as that in the normal shot, during the standby state after the remote control shot mode is set.

Accordingly, even if it is confirmed by the battery checking that the residual capacity of the electric power is enough to perform the normal shot, the camera consumes the electric power much during the standby state after the remote control shot mode is set, so that the residual capacity may not be enough to perform photographing. As a result, there is a problem in that the remote control shot can not be performed well.

Moreover, the conventional camera generates a caution indicating the empty electric battery at the shutter release. In the case of the remote control shot, however, the photographer is usually away from the camera. Therefore, it is difficult for the photographer to notice that the electric battery is empty.

SUMMARY OF THE INVENTION

The present invention has been developed in view of the above-described circumstances, and has as its object to provide a method and an apparatus for checking a battery in a camera so as to perform a photographing without fail in the remote control shot.

To achieve the above-mentioned objects, a method and an apparatus for checking a battery in a camera which is provided with a function of a remote control shot for photographing and a function of automatic power-off for automatically stopping a supply of electricity from a battery of a camera power supply if the camera is left for more than a predetermined time with its power supply on; wherein a residue of the battery is detected when the remote controller shot mode is set, and the remote controller shot mode may be set only if the residue of the battery is more than a quantity of electricity, which is consumed in the predetermined time wherein the function of the auto power-off works in a state that the remote controller shot mode is set, added to a quantity of electricity, which is consumed from the shutter release by the remote controller until a photographing of a next frame is set.

According to the present invention, when the setting of the remote control shot mode is directed, the residual capacity of the electric battery mounted in the camera is detected, and the setting of the remote control shot mode is allowed only if the detected residual capacity is more than a value which is obtained by adding a quantity of electric power consumed within the predetermined time is a value which is obtained by adding a quantity of electricity consumed within the predetermined time to a quantity of electricity consumed from a shutter release by the remote controller to the setting of a next frame shot. The function of automatic power-off is operated after the predetermined time has passed in a state that the remote control shot mode is set. As a result, the photographing can be carried out without fail if the setting of the remote control shot mode is allowed.

DESCRIPTION OF THE PREFERRED EMBODIMENT

Figure 1:
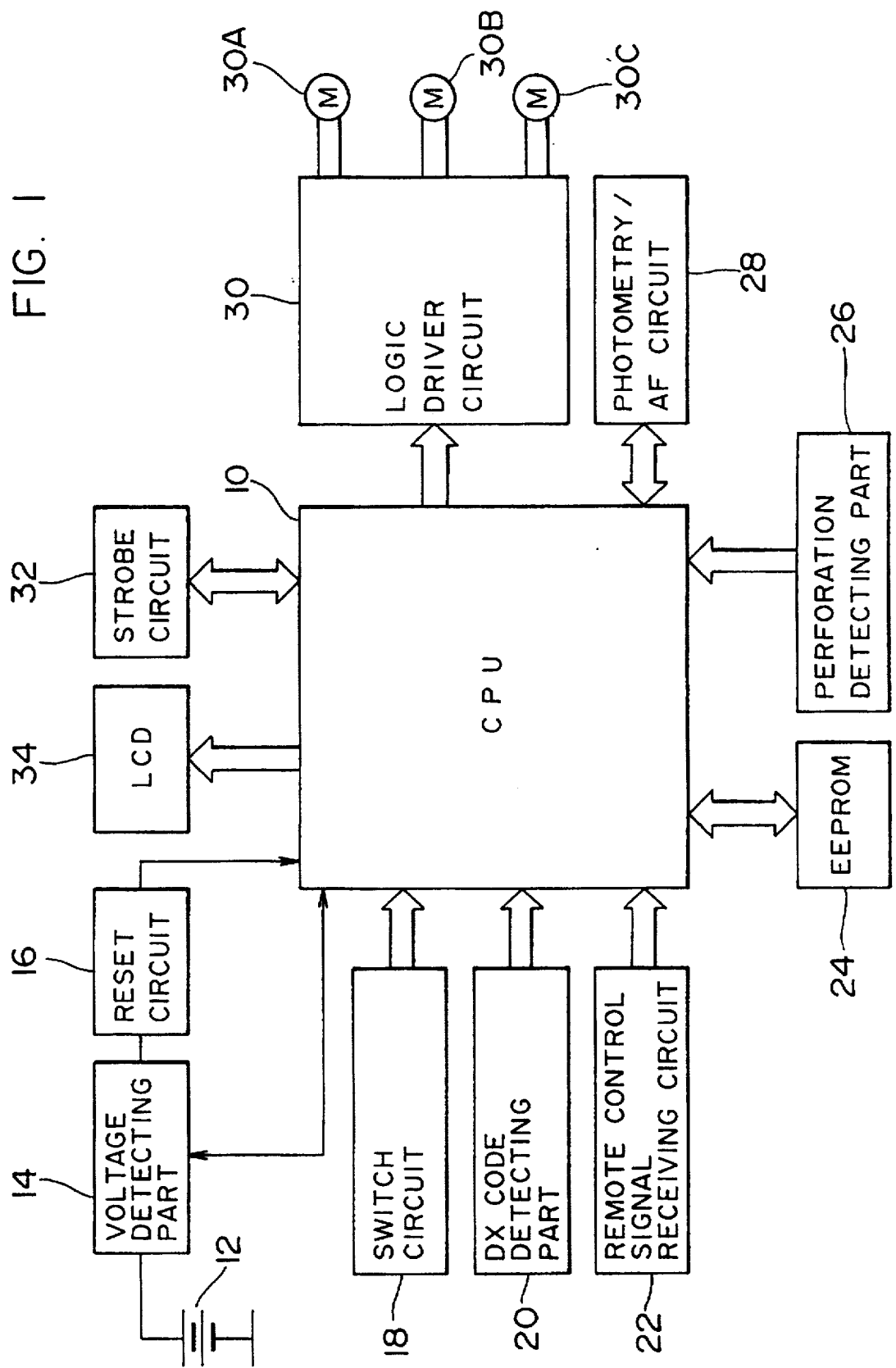
FIG. 1 is a block diagram illustrating a control part of a camera provided with a function of checking the battery, a function of a remote control shot, and a function of automatically turning off power.

As shown in FIG. 1, the control part of a camera of the embodiment mainly comprises a central processing unit (CPU) 10, an electric battery 12, a power source voltage detecting part 14, a reset circuit 16, a switch circuit (SW circuit) 18, a DX code detecting part 20, a remote control signal receiving circuit 22, an EEPROM 24, a perforation detecting part 26, a photometry/automatic focus (AF) circuit 28, a logic driver circuit 30, a strobe circuit 32 and a liquid crystal display (LCD) 34.

The power source voltage detecting part 14 detects the voltage of the electric battery 12, and converts a voltage value into a digital signal by an A/D converter (not shown) to provide the CPU 10 with the digital signal. Then the CPU 10 checks a residual capacity of the electric battery 12 in accordance with the voltage value indicated by the digital signal (battery checking).

As described later, the battery checking is carried out every time a switch of the camera, etc. (for instance, a switch for selecting a shot mode) are operated (hereinafter referred to as a switch operation). When the switch is operated and some signal is transmitted to the CPU 10 from the switch circuit 18, the CPU 10 carries out the battery checking by operating the power source voltage detecting part 14 before carrying out a processing which corresponds the switch operation. Then the CPU 10 displays the residual capacity of the electric battery 12 on the LCD 34 in accordance with the voltage value of the electric battery 12, which is sent from the power source voltage detecting part 14. Incidentally, it is decided that the voltage of the electric battery 12 corresponds to the residual capacity of the electric battery 12 one-to-one, so that the voltage of the electric battery 12 can be converted to the residual capacity of the electric battery 12.

Moreover, the condition of the residual capacity of the electric battery 12 is divided into three levels by two reference voltages (a Caution Voltage and a NG Voltage) which are previously set. As a result, when the residual capacity of the electric battery 12 is enough to take a picture, "Battery OK" is displayed on the LCD 34. When the residual capacity is running short, "Battery Caution" is displayed. Also, when the residual capacity is not enough to take a picture (when the residual capacity is less than the quantity of the electricity required for one shot, that is, the quantity of the electricity required within a time in which a next frame is set after one shutter release), "Battery Empty" is displayed on the LCD 34.

That is, the voltage value detected by the power source voltage detecting part 14 is compared with the predetermined "Caution Voltage" and "NG Voltage" (the Caution Voltage>the NG Voltage). When the voltage value detected by the power source electric voltage detecting part 14 is more than the Caution Voltage, "Battery OK" is displayed on the LCD 34. When the detected voltage value is less than the Caution Voltage and more than the NG Voltage, "Battery Caution" is displayed. When the voltage value is less than the NG Voltage, "Battery Empty" is displayed.

Furthermore, as described later, a criterion voltage (a remote control OK voltage), which is different from the above-mentioned reference voltages, is predetermined for the battery checking which is performed at setting the remote control shot mode. In the case that the NG Voltage is determined, the electric power, which is consumed for a time from the battery checking to the shutter release, is regarded as approximately 0. However, in the case of the remote control shot mode, the electric power consumed by the remote-control receiving circuit 22 cannot be regarded as 0 (the circuit 22 consumes the electric power which is three times as much as the electric power which is consumed during a standby state of the time of normal shot) because the remote control signal receiving circuit 22, which receives a signal transmitted from the remote controller, is operated. Therefore, the remote control OK voltage, which is different from the Caution Voltage and the NG Voltage, is determined so as to judge whether or not one shot is possible in the remote control shot mode.

The minimum voltage of the electric battery 12, which is required for one shot in the remote control shot mode, is a value which is obtained by adding the NG voltage to the voltage corresponding to electric power consumed within a time from the setting of the remote control shot mode (at the battery checking) to the shutter release. However, because the time from the battery checking to the shutter release differs every shot, the remote control OK voltage is determined to be a value which is obtained by adding the NG Voltage to the voltage corresponding to electric power consumed within 5 minutes before the power source is automatically turned off (hereinafter referred to as an automatic power-off). Thus, the photographing can be carried out at least for 5 minutes from the setting of the remote control shot mode to the automatic power-off when the residual capacity is more than the remote control OK voltage.

Incidentally, at the time of the automatic power-off, the operation of each circuit and the supply of the electric power from the electric battery 12 are automatically stopped after the standby state continues for 5 minutes. The CPU 10 checks a signal, which is sent from the switch circuit 18. When the CPU 10 does not receive the signal indicating that the switch operation was carried out from the switch circuit 18 within 5 minutes, the operation of each circuit is stopped, and the supply of the electric power from the electric battery 12 is stopped. At the same time, the CPU 10 is brought into the standby state.

The battery checking is carried out at the time of setting the remote control shot mode in accordance with the remote control OK voltage which is set as mentioned above. If the voltage value detected by the power source voltage detecting part 14 is less than the remote control OK voltage, the setting of the remote-control shot mode is prohibited, and "Battery Empty" is displayed on the LCD 34. Incidentally, a procedure of the battery checking in the remote control shot mode will later be explained in detail.

The reset circuit 16 provides the CPU with a reset signal when the power source of the camera is turned on so that an initialization of the CPU 10 is carried out.

The switch circuit 18 receives signals from switches, and transmits it to the CPU 10. For instance, the switch circuit 18 transmits a signal indicating whether the shutter release button was pressed half or fully, a signal indicating whether the remote control shot mode was selected or not, a signal indicating whether the strobe shot mode was selected or not, a signal indicating whether the self shot mode was selected or not, and the like, to the CPU 10.

The DX code detecting part 20 reads out a DX code from a patrone which is mounted in the camera, and transmits the DX code to the CPU 10. Information such as the number of film, ISO sensitivity, etc. are recorded in the DX code, and the information provided by the DX code detecting part 20 is used as photographing information.

The remote control signal receiving circuit 22 is operated only when the remote control shot mode is set. When the remote control shot mode is set, the remote control shot signal receiving circuit 22 receives a signal of the shutter release, etc. from the remote controller, and transmits the signal to the CPU 10.

EEPROM 24 is capable of memorizing each piece of information even if the supply of the electric power is stopped when the electric battery is replaced and the electric battery is empty. The information relating to the camera operations such that the film is being loaded, one frame is being fed or rewound, and the camera is under the standby state, is memorized in the EEPROM 24. That is, the CPU 10 writes the information relating to the camera operations such that the film is being loaded, and one frame is being fed or rewound in the EEPROM 24 just before a film feed motor 30B is driven by a logic driver circuit 30, and writes the information relating to camera operations such that the camera is under the standby state in the EEPROM 24 just before the film feed motor 30B is stopped after the loading or the one-frame feeding is completed.

The CPU 10 reads out the information relating to the above-mentioned camera operations from the EEPROM 24 when the power source is turned on, and continuously executes an operation which was performed before the camera operations is stopped.

A perforation detecting part 26 detects perforations which are formed in the film when the film is moving, and provides the CPU 10 with a pulse signal every time one perforation is detected. The CPU controls the film transport in accordance with the pulse signal.

The photometry/AF circuit 28 measures a subject brightness and a subject distance by a method of triangle photometry. When the shutter release button is pressed half, and the photometry and a focusing are carried out when the CPU directs the photometry and the focusing. The results of the photometry and the focusing are sent to the CPU 10.

The strobe circuit 32 is charged at the time of photographing with the strobe, and directs the strobe to flash when receiving a flash instruction at a predetermined timing from the CPU 10 in accordance with the shutter release.

Next, a procedure for the battery checking when the shot mode selection switch is operated will be described with reference to the flow charts of FIGS. 2, 3 and 4. Incidentally, the battery checking in the normal shot, which is carried out by a switch operation other than that for setting of the remote control shot mode will be shown in the flow chart of FIG. 4, but the details will be described later.

Figure 2:
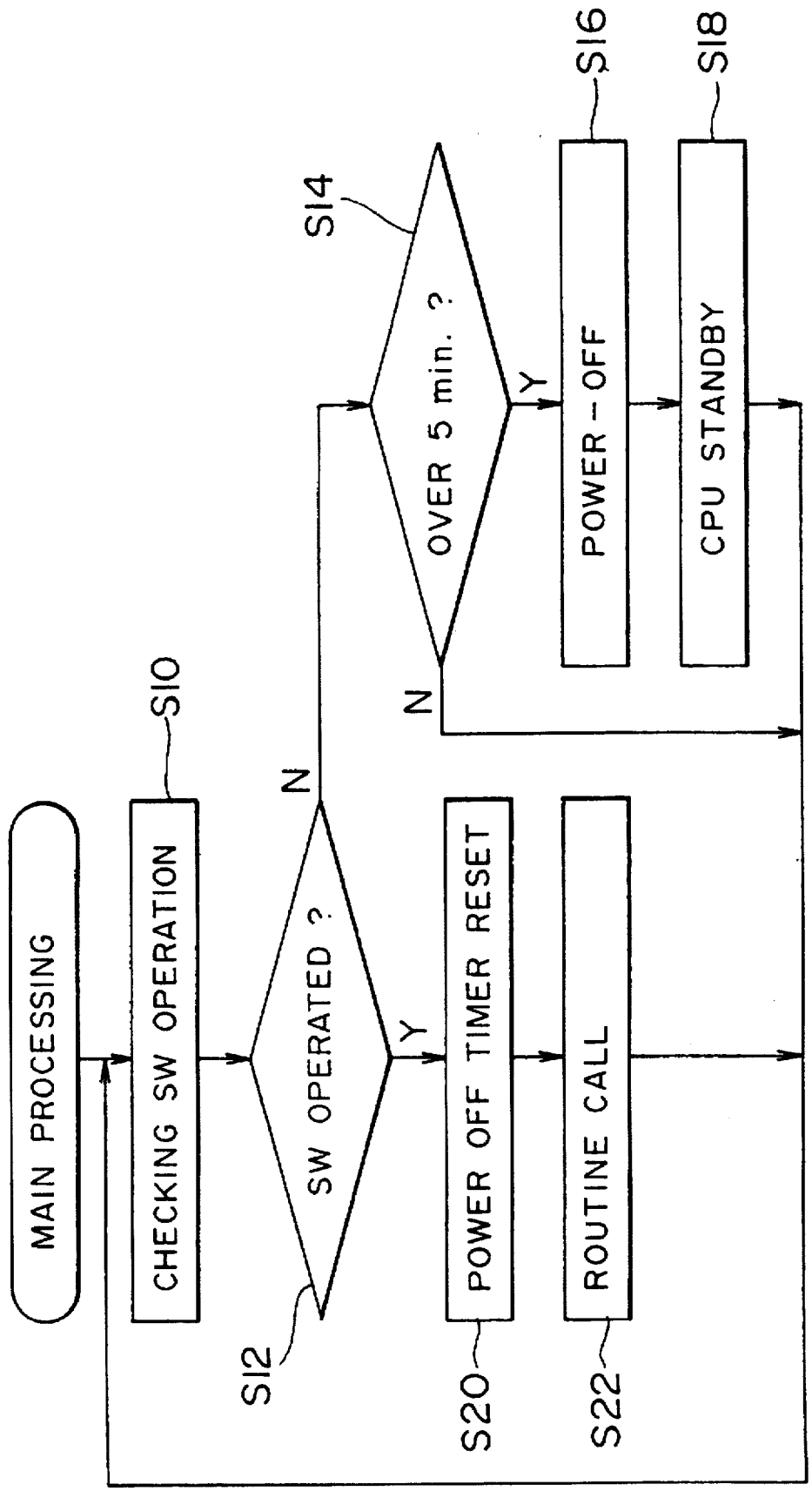
FIG. 2 is a flow chart illustrating a main processing of a CPU.

When the power source is turned on, the electric power is supplied to the CPU 10, which first starts a main processing as shown in FIG. 2. In the main processing, the CPU checks an output signal from the switch circuit 18 (Step S10), and judges whether any switch has been operated or not (Step S12). If no switch has been operated, the CPU 10 judges whether time indicated by a power-off timer is more than 5 minutes (Step S14). The power-off timer measures a time from the last switch operation to a next switch operation. If the time of the power-off timer is less than 5 minutes, the processing returns to Step S10, and the CPU 10 checks the output signal from the switch circuit 18 again.

If the time of the power-off timer exceeds 5 minutes, the CPU 10 stops operations in each circuit and stops the supply of the electric power to each circuit (Step S16), and then the CPU 10 comes into the standby state (Step S18). In this state, a signal for releasing the standby state of the CPU 10 is sent from the switch circuit 18 when some switch operation is carried out. As a result, the CPU 10 restarts the supply of the electric power to each circuit, and starts a processing in accordance with the switch operation.

On the other hand, when it is judged that some switch operation has been carried out in Step S12, the power-off timer is reset (Step S20), and a routine corresponding to the switch operation is performed (routine call) (Step S22).

After the routine is executed, the operation returns to Step S10, and a switch operation which is to be performed next is checked and the above-mentioned processing is repeated.

Next, an explanation will be given of a routine when the remote control shot mode is selected by the above-mentioned switch operation with reference to the flow chart of FIGS. 3 and 4.

Figure 3:
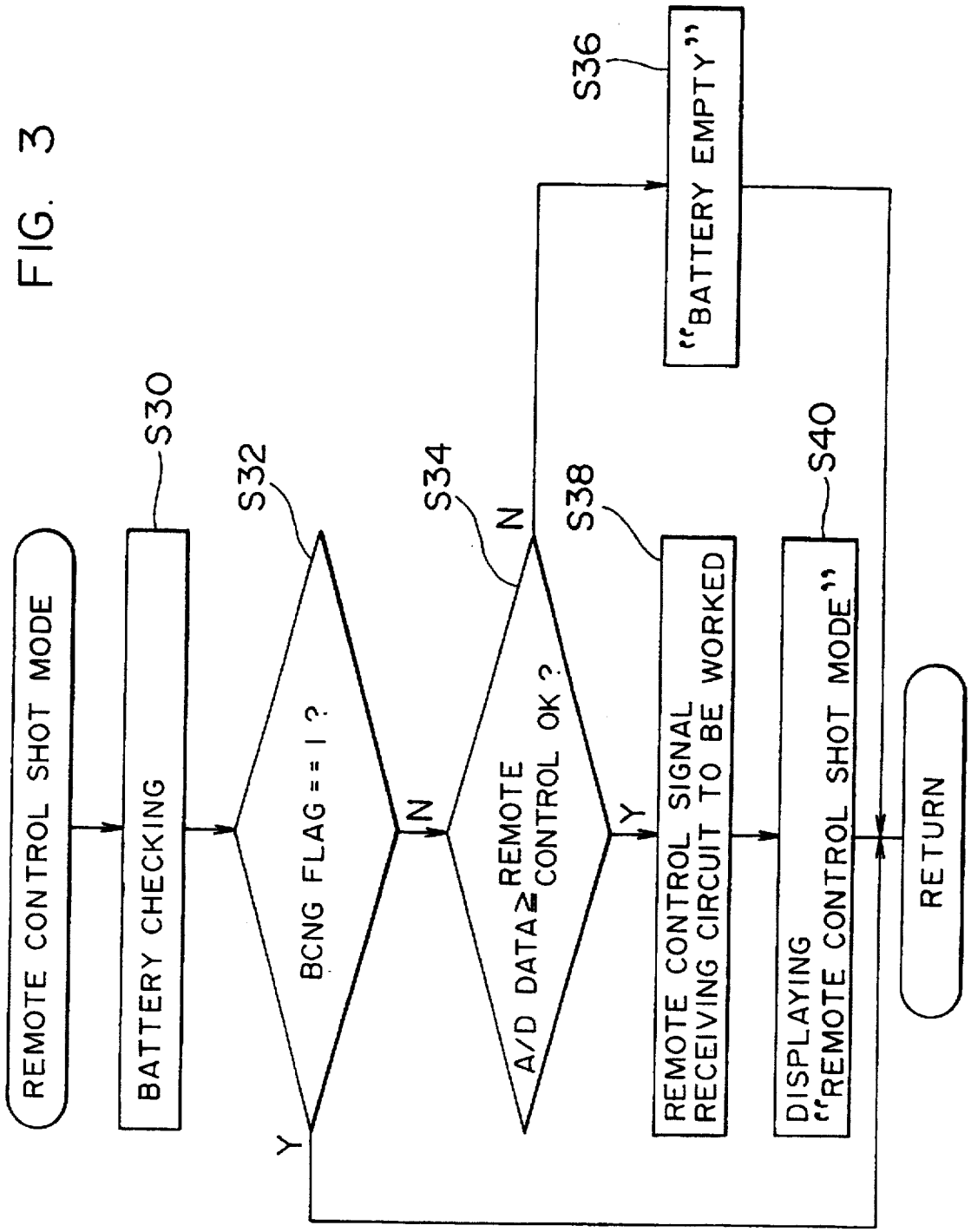
FIG. 3 is a flow chart illustrating a processing of setting a remote control shot mode in a CPU.
Figure 4:
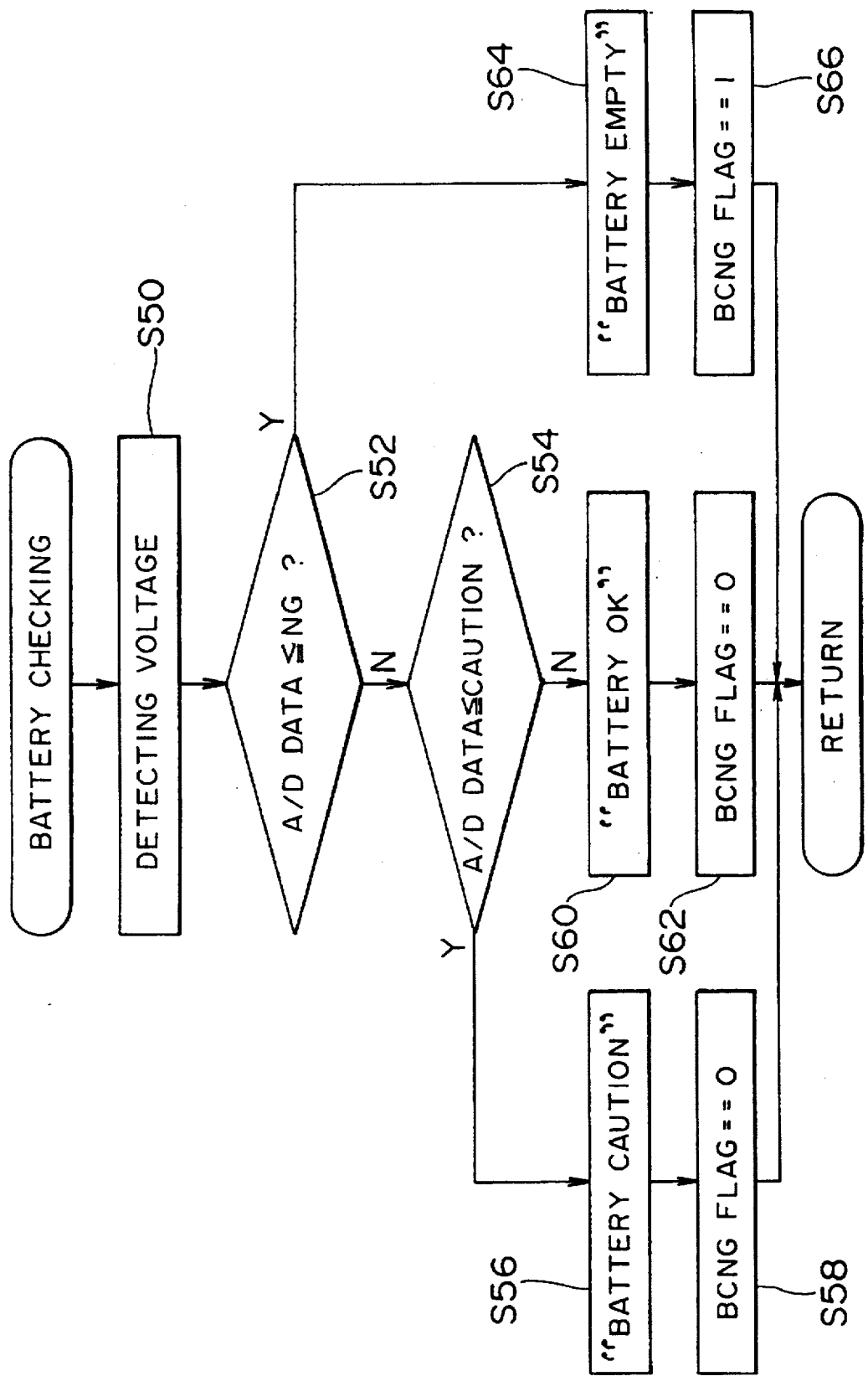
FIG. 4 is a flow chart illustrating a processing of checking battery in the CPU.

When the remote control shot mode is selected by the switch operation, the routine for setting the remote control is executed as shown in FIG. 3. In this routine, the battery checking is first performed as shown in FIG. 4. (Step S30). Incidentally, the battery checking in FIG. 4 is applied for the normal shot.

A procedure for the battery checking will be explained with reference to the flow chart of FIG. 4. The voltage of the electric battery 12 is read out from the power source electric voltage detecting part as a digital signal via the A/D converter (Step S50). Then it is judged whether the voltage of the electric battery 12, which is indicated by the digital signal, is less than the NG voltage or not (Step S52). If the voltage value of the electric battery 12 is less than the NG voltage, "Battery Empty" is displayed on the LCD 34 (Step S64), and a Battery Checking NG flag (BCNG flag) is set to 1 (Step S66).

On the other hand, when the voltage of electric battery 12 is more than the NG voltage, it is judged whether the voltage is less than the Caution voltage or not (Step S54). If the voltage of the electric battery 12 is less than the Caution voltage, "Battery Caution" is displayed on the LCD 34 (Step S56), and the BCNG flag is reset to 0 (Step S58).

If the voltage of the electric battery 12 is more than the Caution voltage, "Battery OK" is displayed on the LCD 34 (Step S60), and the BCNG flag is reset to 0 (Step S62).

As mentioned above, the BCNG flag is set to 1 when the voltage of the electric battery 12 is less than the NG voltage, and it is reset to 0 when the electric voltage of the electric battery 12 is more than the NG voltage.

Then, the operation returns to the routine for setting the remote control as shown in FIG. 3, and then it is judged whether the BCNG flag is 1 or not (Step S32). If the BCNG flag is 1, the routine for setting the remote control is stopped. That is, the setting of the remote control shot mode is prohibited.

On the other hand, if the BCNG flag is 0, it is judged whether the voltage of the electric battery 12 is more than the remote control OK voltage or not (Step S34). If the voltage of the electric battery 12 is less than the remote control OK voltage, the residual capacity of the electric battery 12 is decreased to an extent that one shot is impossible within 5 minutes after the remote control shot mode is set. As a result, "Battery Empty" is displayed on the LCD 34 (Step S36), and the routine for setting the remote control is stopped. That is, the setting of the remote control shot mode is prohibited in this case.

If the voltage of the electric battery 12 is more than the remote control OK voltage, the electric power is supplied to the remote control signal receiving circuit 22, so that the circuit 22 starts to work (Step S38). Then the remote control shot mode is set, and it is displayed on the LCD 34 that the remote control shot mode has been set (Step S40).

When the above-mentioned routine for setting the remote control is completed, the operation returns to the main routine as shown in FIG. 2.

As mentioned above, in the case of the remote control shot mode, the residual capacity of the electric battery is compared with the remote control OK voltage which is obtained by adding a minimum voltage (NG voltage) of the electric battery required for one shot in the normal shot and the voltage corresponding to the quantity of electricity consumed for 5 minutes after the setting of the remote control shot mode until the power is automatically turned off. Thus, it is judged whether the remote control shot mode can be set or not, that is, whether or not the remote control shot mode can be performed perfectly.

As has been described above, according to the method and the apparatus for checking the battery in the camera of the present invention, the residual capacity of the electric battery is detected when the remote control shot mode is set. The setting of the remote control shot mode is allowed only when the residual capacity of the electric battery is more than a value which is obtained by adding the quantity of electricity consumed within a predetermined time after the setting of the remote control shot mode until the power is automatically turned off, to the quantity of electricity consumed from the shutter release by the remote controller to the setting of the next frame shot. Therefore, the photographing can be carried out without fail when the setting of the remote-control shot mode is allowed.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method for checking a battery in a camera which can selectively operate in a remote control ready mode wherein a remote control signal receiving circuit is activated to receive a remote control signal and capture an image in response thereto, and which has an auto-power off function for automatically stopping a supply of electricity from the battery if the camera is left in its remote control ready mode for more than a predetermined waiting time without recording an image, comprising the steps of:

measuring a residual charge of the battery when the remote control ready mode is selected;

determining a maximum required amount of electricity for a remote control image capture, equal to the sum of an amount of electricity that will be consumed by the camera operating in the remote control ready mode with said remote control signal receiving circuit activated during said predetermined waiting time, and an amount of electricity required to capture the image;

comparing said measured residual charge to said maximum required amount of electricity to determine whether the battery has enough charge to operate the camera in its remote control ready mode for at least the predetermined waiting time of the auto-power off function and capture the image; and entering the remote control ready mode only if said measured residual charge is greater than said maximum required amount of electricity.

2. The method of claim 1 comprising the further step of providing an indication of insufficient battery power when the residual charge is less than the maximum required amount of electricity.

3. The method of claim 1 wherein said predetermined waiting time is five minutes.

4. The method of claim 1 wherein the residual charge of the battery is determined by measuring a voltage output of the battery, and the maximum required amount of electricity is determined by calculating a no-go voltage which is the minimum battery voltage required to operate the camera in its remote control ready mode for at least the predetermined waiting time of the auto-power off function and capture the image.

5. The method of claim 1 wherein said amount of electricity required to capture the image is equal to an amount of electricity consumed between a shutter release and a setting of a next frame shot.

6. The method of claim 5 wherein said amount of electricity required to capture the image includes electricity used by a film feed motor.

7. An apparatus for checking a battery in a camera which can selectively operate in a remote control ready mode wherein a remote control signal receiving circuit is activated to receive a remote control signal and capture an image in response thereto, and which has an auto-power off function for automatically stopping a supply of electricity from the battery if the camera is left in its remote control ready mode for more than a predetermined waiting time without recording an image, comprising:

battery residual charge detection means for measuring a residual charge of the battery when the remote control ready mode is selected;

comparison means for comparing said measured residual charge to a maximum required amount of electricity for a remote-controlled image capture equal to the sum of an amount of electricity that will be consumed by the camera operating in the remote control ready mode during said predetermined waiting time and an amount of electricity required to capture the image, to determine whether the battery has enough charge to operate the camera in its remote control ready mode for at least the predetermined waiting time of the auto-power off function and capture the image; and remote control mode setting means connected to the comparison means for placing the camera in the remote control ready mode only if said measured residual charge is greater than said maximum required amount of electricity.

8. The apparatus of claim 7 further comprising battery indicating means connected to said comparison means for providing an indication of insufficient battery power when the measured residual charge is less than the maximum required amount of electricity.

9. The apparatus of claim 7 wherein said predetermined waiting time is five minutes.

10. The apparatus of claim 7 wherein said battery residual charge detection means measures the residual charge of the battery by measuring a voltage output of the battery, and said comparison means compares said voltage output to a voltage which is the minimum battery voltage required to operate the camera in its remote control ready mode for at least the predetermined waiting time of the auto-power off function and capture the image.

11. The apparatus of claim 7 wherein said amount of electricity required to capture the image is equal to an amount of electricity consumed between a shutter release and a setting of a next frame shot.

12. The apparatus of claim 11 wherein said amount of electricity required to capture the image includes electricity used by a film feed motor.

* * * * *